United States Patent
Hattori et al.

(10) Patent No.: US 8,842,436 B2
(45) Date of Patent: Sep. 23, 2014

(54) INVERTER MODULE AND INTEGRATED-INVERTER ELECTRIC COMPRESSOR USING GEL-LIKE MATERIAL FOR ABSORBING VIBRATION TO A CONTROL BOARD

(75) Inventors: Makoto Hattori, Kiyosu (JP); Masahiko Asai, Kiyosu (JP); Kazuki Niwa, Kiyosu (JP); Takayuki Takashige, Kiyosu (JP); Koji Nakano, Nagoya (JP); Takashi Nakagami, Nagoya (JP); Shunsuke Yakushiji, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 374 days.

(21) Appl. No.: 13/119,892
(22) PCT Filed: Feb. 25, 2010
(86) PCT No.: PCT/JP2010/052953
§ 371 (c)(1),
(2), (4) Date: May 26, 2011
(87) PCT Pub. No.: WO2010/101068
PCT Pub. Date: Sep. 10, 2010

(65) Prior Publication Data
US 2011/0236235 A1 Sep. 29, 2011

(30) Foreign Application Priority Data
Mar. 6, 2009 (JP) .................. 2009-053467

(51) Int. Cl.
H05K 7/20 (2006.01)
H02M 1/00 (2006.01)
B60H 1/00 (2006.01)
B60H 1/32 (2006.01)

(52) U.S. Cl.
CPC .......... *B60H 1/3222* (2013.01); *B60H 1/00428* (2013.01)
USPC ............................ 361/720; 363/141; 363/147

(58) Field of Classification Search
USPC ........... 174/52.3, 76; 361/704, 705, 707, 708, 361/715, 719–721, 746, 751; 363/141, 147; 257/787–795
See application file for complete search history.

(56) References Cited

U.S. PATENT DOCUMENTS 5,825,085 A * 10/1998 Masumoto et al. ........... 257/704
6,115,270 A 9/2000 Yamane et al.
(Continued)

FOREIGN PATENT DOCUMENTS

JP 6-29670 A 2/1994
JP 2000-333476 A 11/2000
(Continued)

OTHER PUBLICATIONS

International Search Report of PCT/JP2010/052953, date of mailing Apr. 20, 2010.
(Continued)

*Primary Examiner* — Jue Zhang
*Assistant Examiner* — Lakaisha Jackson
(74) *Attorney, Agent, or Firm* — Westerman, Hattori, Daniels & Adrian, LLP

(57) ABSTRACT

An object is to provide an inverter module that can ensure satisfactory anti-vibration strength, moisture resistance, and isolation for each of the upper and lower boards of the inverter module and that can reduce the weight and cost, and to provide an integrated-inverter electric compressor. In an inverter module (21) in which a power system board (23) and a control board (31) are integrated via a resin case (22), the inverter module (21) is configured such that the power system board (23), on which a semiconductor switching device (24) is mounted, is provided at the lower part of the resin case (22) and the control board (31), on which a control-and-communication circuit is mounted, is provided thereabove. In the resin case (22), a thermosetting resin (36) is filled to a height position where the top surface of the power system board is covered (23), so that the power system board (23) is encapsulated in the resin, and a gel-like resin material (38) is filled from a resin-encapsulated surface (37) to a height position where a part of the control board (31) is covered.

4 Claims, 3 Drawing Sheets

(56) References Cited

U.S. PATENT DOCUMENTS

| | | | |
|---|---|---|---|
| 6,313,598 B1* | 11/2001 | Tamba et al. | 318/722 |
| 6,597,063 B1* | 7/2003 | Shimizu et al. | 257/687 |
| 7,116,557 B1* | 10/2006 | Raby et al. | 361/720 |
| 2003/0182956 A1* | 10/2003 | Kurita et al. | 62/228.1 |
| 2004/0194486 A1 | 10/2004 | Kurita et al. | |

FOREIGN PATENT DOCUMENTS

| | | |
|---|---|---|
| JP | 2003-332526 A | 11/2003 |
| JP | 2006-316754 A | 11/2006 |
| JP | 3845769 B1 | 11/2006 |
| JP | 2007-315269 A | 12/2007 |
| JP | 2008-166358 A | 7/2008 |

OTHER PUBLICATIONS

Japanese Office Action dated Oct. 15, 2013, issued in corresponding Japanese Patent Application No. 2009-053467, w/ English translation.

Chinese Office Action dated Mar. 4, 2013, issued in corresponding Chinese Patent Application No. 201080002518.9, with English translation (16 pages).

* cited by examiner

US 8,842,436 B2

INVERTER MODULE AND INTEGRATED-INVERTER ELECTRIC COMPRESSOR USING GEL-LIKE MATERIAL FOR ABSORBING VIBRATION TO A CONTROL BOARD

TECHNICAL FIELD

The present invention relates to inverter modules in which an inverter device is integrally mounted in a housing of an electric compressor, the inverter modules being suitable for use in vehicle air-conditioners, and to integrated-inverter electric compressors.

BACKGROUND ART

Integrated-inverter electric compressors having an integrated inverter device are known as compressors for air-conditioners installed in hybrid cars, electric cars, etc. Typically, such an integrated-inverter electric compressor is configured such that an inverter accommodating portion (inverter box) is provided on the outer periphery of a housing accommodating an electric motor and a compression mechanism, and an inverter device that converts DC power supplied from a power source to AC power and applies the AC power to the electric motor through a glass-sealed terminal is mounted therein.

The above-described inverter device is typically configured to include a power system board, on which is mounted a switching circuit composed of a plurality of semiconductor switching devices for converting DC power to AC power, such as IGBTs, and a control board, on which is mounted a control-and-communication circuit, such as a CPU, having elements operating at a low voltage, the two boards being stacked on each other. The two boards are integrally mounted to the outer periphery of a compressor housing, by being accommodated in an inverter case or an outer frame.

These integrated-inverter electric compressors for vehicle air-conditioners are used under severe temperature and vibration conditions. Therefore, the inverter devices are also required to have high vibration resistance, moisture resistance, and isolation. Accordingly, proposals have been made in which an inverter accommodating portion, in which an inverter device is mounted, is filled with a gel-like resin material and in which the control board is placed so as to float in a gel-like resin material (for example, see PTLs 1 and 2). A proposal has been made in which three boards, namely, a metal board, a control board, and an interface board, are stacked in a resin case, a power semiconductor surface of the metal board is covered with a gel material, and a space from the surface thereof to the top surface of the control board is covered with resin (for example, see PTL 3).

CITATION LIST

Patent Literature

PTL 1
  Japanese Unexamined Patent Application, Publication No. 2006-316754
PTL 2
  Japanese Unexamined Patent Application, Publication No. 2007-315269
PTL 3
  The Publication of Japanese Patent No. 3845769

SUMMARY OF INVENTION

Technical Problem

In the above-described power system board, the semiconductor switching devices are typically mounted on the board by wire bonding, and these wire bonds have to be protected from severe thermal cycling, heat shock, vibration, and the like. However, there has been a problem in that, because the disclosures in PTLs 1 to 3 are all configured such that the surface of the power system board, on which the semiconductor switching devices are mounted, is covered with a gel-like resin material, although it has been possible to ensure isolation and the moisture resistance, it has not been possible to ensure highly reliable and satisfactory anti-vibration strength that can withstand severe thermal cycling, heat shock, vibration, and the like with such a configuration.

In a configuration in which an inverter accommodating portion is completely filled with a gel-like resin material, a large amount of heavy and expensive gel-like resin material is required. Thus, such a configuration cannot be said to be an appropriate solution for integrated-inverter electric compressors for vehicle air-conditioners, which particularly need to be reduced in size and weight. In addition, as shown in PTL 3, coating the control board (CPU board), which is disposed in the upper layer, with resin makes not only the maintenance of the power system board in the lower layer difficult in practice, but also the maintenance of the control board itself.

The present invention has been made in view of the above-described circumstances, and an object thereof is to provide an inverter module that can ensure satisfactory anti-vibration strength, moisture resistance, and isolation for each of the upper and lower boards of the inverter module and that can reduce the weight and cost, and to provide an integrated-inverter electric compressor.

Solution to Problem

To solve the above-described problems, the inverter module and integrated-inverter electric compressor of the present invention employ the following solutions.

That is, an inverter module according to a first aspect of the present invention is an inverter module in which a power system board that converts DC power supplied from a power source to AC power and applies the AC power to an electric motor and a control board that controls the AC power applied to the electric motor are integrated via a resin case. The inverter module is configured such that the power system board, on which a semiconductor switching device is mounted, is provided at the lower part of the resin case and the control board, on which a control-and-communication circuit operating at a low voltage, such as a CPU, is provided thereabove. The resin case is filled with a thermosetting resin to a height position where the top surface of the power system board is covered, so that the power system board is encapsulated in the resin, and is filled with a gel-like resin material from a resin-encapsulated surface to a height position where at least a part of the control board is covered.

In the first aspect of the present invention, the inverter module is configured such that the power system board is provided at the lower part of the resin case, which integrates the power system board and the control board, and the control board is provided thereabove. In addition, the first aspect of the present invention is configured such that the top surface of the power system board, on which the semiconductor switching device is mounted, is covered with the thermosetting resin so that the power system board is encapsulated in the resin, and such that the gel-like resin material is filled from the resin-encapsulated surface to the height position where a part of the control board is covered. Thus, the power system board, on which the semiconductor switching device is mounted by wire bonding, can be encapsulated in the thermosetting resin and securely fixed. Accordingly, not only can isolation and moisture resistance be ensured, but also satisfactory anti-vibration strength that can withstand severe thermal cycling, heat shock, vibration, and the like can be ensured. Furthermore, because the gel-like resin material is filled from the resin-encapsulated surface to the height position where a part of the control board is covered, it is possible to ensure that the control board has sufficient vibration resistance and isolation. Thus, damage to components and components dropping off the control board, due to vibration, can be reliably prevented. In addition, because the gel-like resin material may be filled from the resin-encapsulated surface in the resin case to the height at which a part of the control board is covered, the amount of the gel-like resin material for filling can be reduced. Accordingly, the weight and cost can be reduced by an amount corresponding to this reduction, and maintenance of the control board can be performed as necessary.

An inverter module according to the first aspect of the present invention may be configured such that the gel-like resin material is filled to a height position where at least the top surfaces of a microcomputer component, such as a CPU, and an oscillator-circuit component, which are mounted on the top surface of the control board, are covered.

According to the above-described configuration, the gel-like resin material is filled to a height position where at least the top surfaces of a microcomputer component, such as a CPU, and an oscillator-circuit component, which are mounted on the top surface of the control board, are covered. Thus, the top surfaces of the microcomputer component, such as a CPU, and oscillator-circuit component, which are originally coated in a moisture-resistant coating, are covered again with the gel-like resin material. Accordingly, the moisture-resistant effect of these components can be improved. Since this further improves the moisture resistance reliability of the control board, the moisture-resistant coating can be omitted in some cases.

Furthermore, any one of the above-described inverter modules may be configured such that the gel-like resin material is filled to a height position where the lower half of large components, such as a transformer and an electrolytic capacitor, which are mounted on the top surface of the control board, is covered.

According to the above-described configuration, the gel-like resin material is filled to a height position where the lower half of large components, such as a transformer and an electrolytic capacitor, which are mounted on the top surface of the control board, is covered. Thus, the lower half of the large components, such as the transformer and the electrolytic capacitor, can be embedded in the gel-like resin material, so that they are restrained by the gel-like resin material. Accordingly, the vibration-suppressing effect of these large components can be improved, and the vibration resistance of the control board can be raised to a higher level.

Furthermore, any one of the above-described inverter modules may be configured such that the control board has a through-hole provided at at least one location, through which the gel-like resin material is filled.

According to the above-described configuration, because the control board has a through-hole provided at at least one location, through which the gel-like resin material is filled, the gap between the control board and the resin-encapsulated surface on the power system board can be easily filled with the gel-like resin material through the through-hole. In addition, whether or not the gap is completely filled with the gel-like resin material can be confirmed by the fact that the gel-like resin material flows out of the through-hole. Accordingly, filling of the gel-like resin material can be appropriately and easily managed.

Furthermore, an integrated-inverter electric compressor according to a second aspect of the present invention is an integrated-inverter electric compressor in which an inverter accommodating portion is provided on the outer periphery of a housing accommodating an electric motor and a compression mechanism, an inverter device that converts DC power from a power source to AC power and applies the AC power to the electric motor being integrally mounted therein. The inverter device including any one of the above-described inverter modules is integrally mounted in the inverter accommodating portion.

In the second aspect of the present invention, by the above configuration, it is possible to improve the anti-vibration strength, moisture resistance, and isolation of the inverter device that is most susceptible to the usage environment in the integrated-inverter electric compressor for a vehicle, which is used under severe temperature and vibration conditions. In addition, the weight and cost of the inverter device can be reduced. As a result, the integrated-inverter electric compressor can be improved in reliability and reduced in cost, and ease of installation in a vehicle can be improved.

Advantageous Effects of Invention

In the inverter module of the present invention, the power system board on which the semiconductor switching device is mounted by wire bonding can be encapsulated in the thermosetting resin and securely fixed. Accordingly, not only can isolation and moisture resistance be ensured, but also satisfactory anti-vibration strength that can withstand severe thermal cycling, heat shock, vibration, and the like can be ensured. Furthermore, because the gel-like resin material is filled from the resin-encapsulated surface to the height position where a part of the control board is covered, it is possible to ensure that the control board has sufficient vibration resistance and isolation. Thus, damage to components and components dropping off the control board, due to vibration, can be reliably prevented. In addition, because the gel-like resin material may be filled from the resin-encapsulated surface in the resin case to the height at which a part of the control board is covered, the amount of the gel-like resin material for filling can be reduced. Accordingly, the weight and cost can be reduced by an amount corresponding to this reduction, and maintenance of the control board can be performed as necessary.

According to the integrated-inverter electric compressor of the present invention, it is possible to improve the anti-vibration strength, moisture resistance, and isolation of the inverter device that is most susceptible to the usage environment in the integrated-inverter electric compressor for a vehicle, which is used under severe temperature and vibration conditions. In addition, the weight and cost of the inverter device can be reduced. As a result, the integrated-inverter electric compressor can be improved in reliability and reduced in cost, and ease of installation in a vehicle can be improved.

DESCRIPTION OF EMBODIMENTS

Embodiments of the present invention will be described below with reference to the drawings.

First Embodiment

A first embodiment of the present invention will be described using FIGS. 1 to 3.

Figure 1:
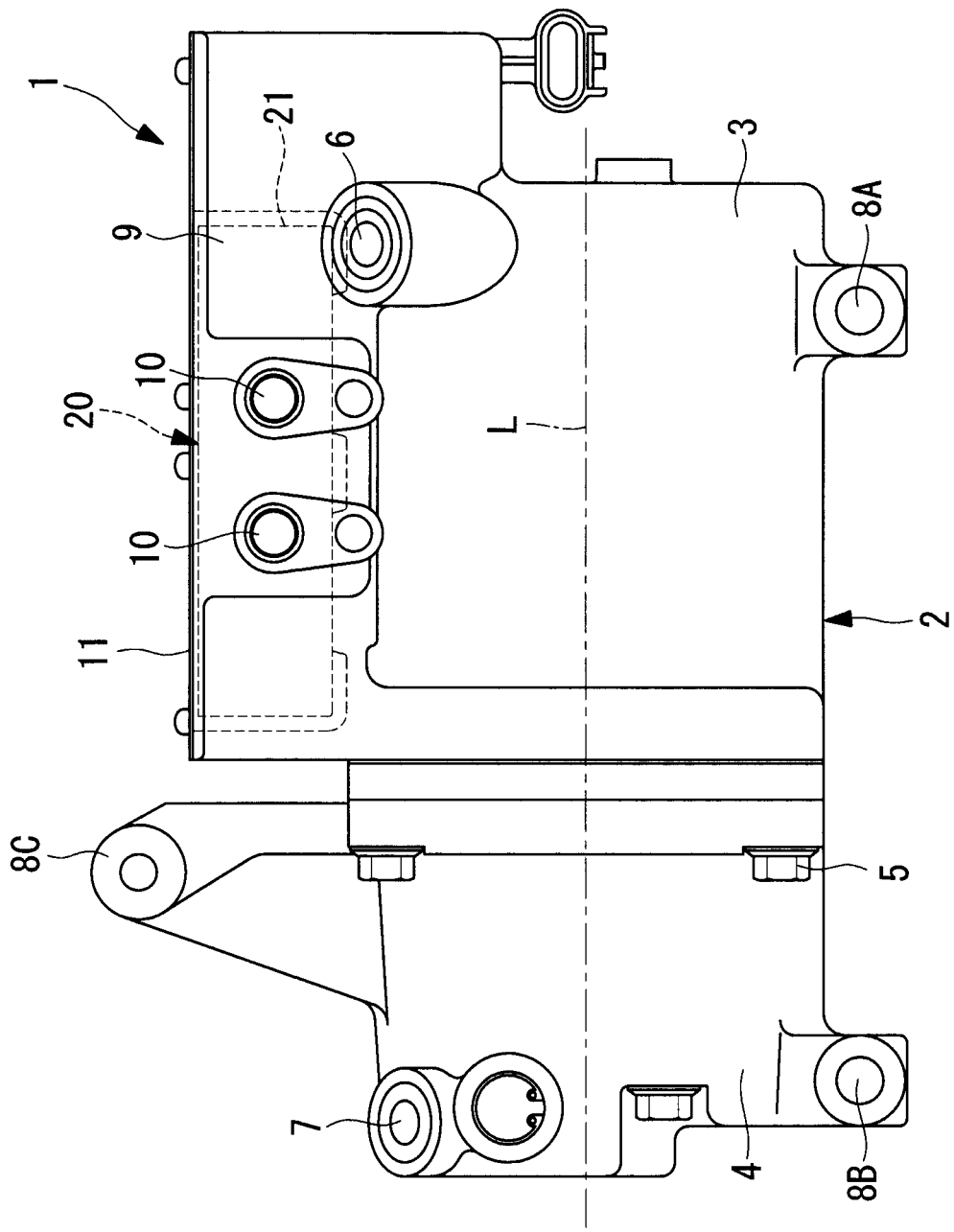
FIG. 1 is a side view of an integrated-inverter electric compressor according to a first embodiment of the present invention.
Figure 2:
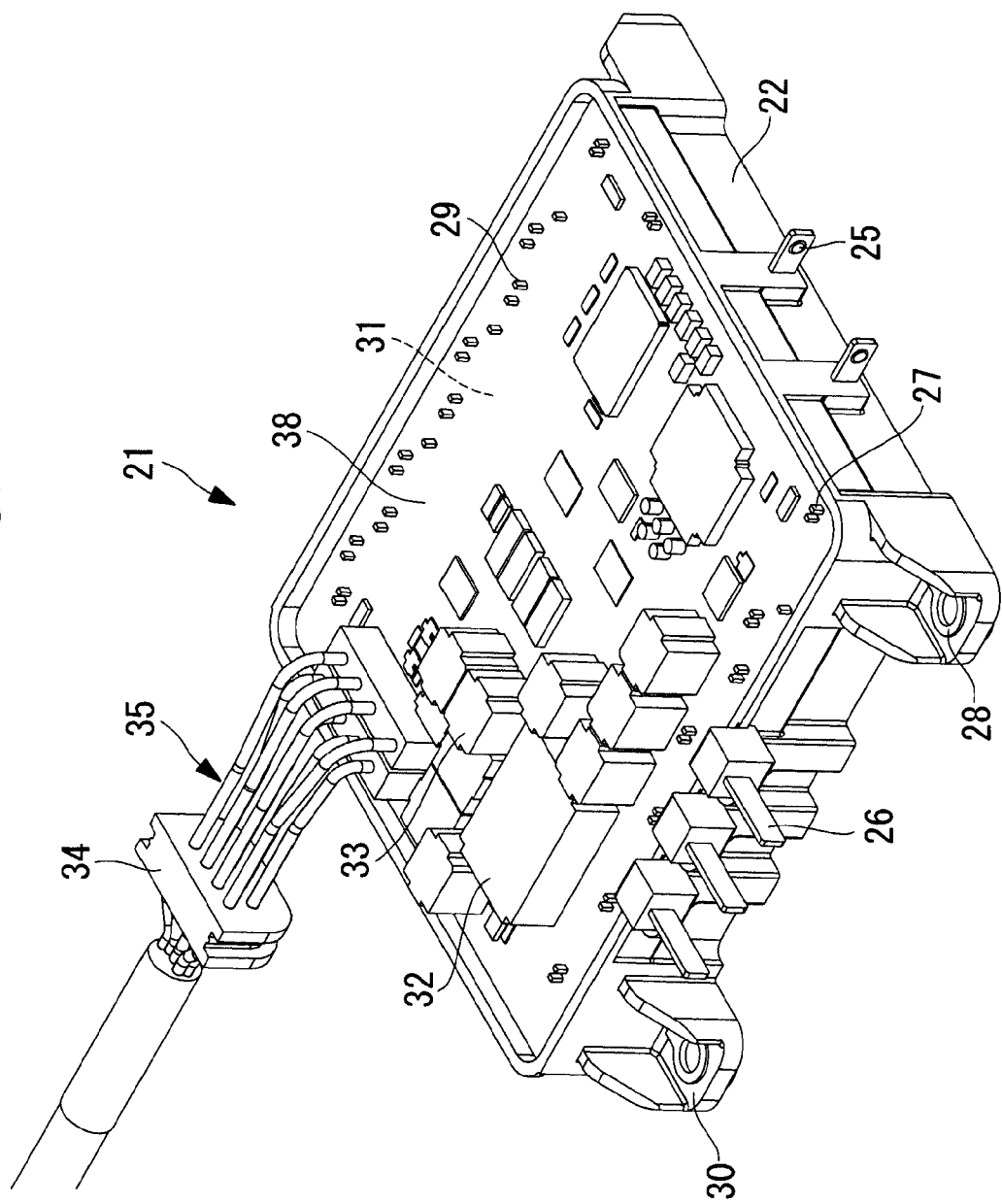
FIG. 2 is a perspective view of an inverter module mounted in the integrated-inverter electric compressor shown in FIG. 1.

FIG. 1 shows a side view of an integrated-inverter electric compressor according to a first embodiment of the present invention. An integrated-inverter electric compressor 1 includes a housing 2 serving as an outer shell. The housing 2 is formed by joining a motor housing 3 accommodating an electric motor (not shown) and a compressor housing 4 accommodating a compression mechanism (not shown) to form a single component with bolts 5. The motor housing 3 and the compressor housing 4 are pressure-resistant containers and are formed of die cast aluminum.

The electric motor and compression mechanism (not shown) accommodated in the housing 2 are configured to be connected via a motor shaft, so that rotation of the electric motor drives the compression mechanism. The motor housing 3 has a refrigerant intake port 6 at one end (on the right side in FIG. 1). Low-temperature, low-pressure refrigerant gas taken into the motor housing 3 through the refrigerant intake port 6 circulates around the electric motor in the direction of the motor axis L and is introduced into the compression mechanism where it is compressed. The system is configured such that high-temperature, high-pressure refrigerant gas compressed by the compression mechanism is discharged into the compressor housing 4 and directed outside from a discharge port 7 provided at one end (the left side in FIG. 1) of the compressor housing 4.

The housing 2 has mounting legs 8A, 8B, and 8C provided at three locations in total; for example, two locations at one end (the right side in FIG. 1) on the lower side of the motor housing 3 and at one end (the left side in FIG. 1) on the lower side of the compressor housing 4, and one location on the upper side of the compressor housing 4. The integrated-inverter electric compressor 1 is installed on the vehicle side by securing these mounting legs 8A, 8B, and 8C to a side wall or the like of an engine disposed in the engine compartment of a vehicle, using brackets and bolts.

An inverter accommodating portion 9 having a predetermined volume on the upper side thereof is formed integrally with the outer periphery of the motor housing 3. This inverter accommodating portion 9 has the shape of an open-topped box enclosed by surrounding walls having a predetermined height and has two cable lead-out ports 10 provided in a side surface thereof. The top surface of the inverter accommodating portion 9 is sealed by fixing a cover member 11 thereto with screws.

The inverter accommodating portion 9 accommodates an inverter device 20 that converts DC power supplied from a high-voltage power source unit (not shown) installed in the vehicle or from a battery etc. through a high-voltage cable into three-phase AC power and applies the AC power to the electric motor accommodated in the motor housing 3. The inverter device 20 includes an inverter module 21, which will be described in detail below, and high-voltage components, such as a smoothing capacitor (head capacitor) and an inductor coil (not shown). FIG. 2 shows a perspective view of the inverter module 21, and FIG. 3 shows a view corresponding to a vertical cross-section of the inverter module 21 shown in FIG. 2.

The inverter module 21 includes a rectangular resin case 22, the bottom of which is integrally formed with a power system board 23 made of an aluminum plate or the like by insert molding. A switching circuit composed of a plurality of semiconductor switching devices 24, such as IGBTs, is mounted on the power system board 23. In addition to the power system board 23, P-N terminals 25 to which high-voltage power source lines are connected, U-V-W terminals 26 that supply three-phase AC power to the electric motor, earths 27, earth terminals 28, multiple connection terminals 29 that connect the power system board 23 to the control board 31 (described below), and the like are formed integrally with the resin case 22 by insert molding.

As described above, the resin case 22 has a rectangular shape. The P-N terminals 25 project from the edge along the side surface of the inverter accommodating portion 9, on which the cable lead-out ports 10 are provided, and the U-V-W terminals 26 project from the edge that adjoins the side surface having the cable lead-out ports 10 and is closest to the compressor housing 4. The resin case 22 has integrally formed fixing legs 30 at four corners, which will be securely fastened to the bottom surface of the inverter accommodating portion 9 with bolts. These fixing legs 30 each have the above-mentioned earth terminal 28 through which the bolt is inserted. The grounds of the power system board 23 and control board 31 (described below) are configured to be frame-grounded to the housing 2, by fixing the resin case 22 to the bottom surface of the inverter accommodating portion 9 with the bolts.

The control board (CPU board) 31 is disposed in the upper part of the resin case 22 so as to be positioned away from the power system board 23 by a predetermined distance. The control board 31 is supported by the multiple connection terminals 29 and earths 27. The control-and-communication circuit composed of elements operating at a low voltage, such as a CPU, is mounted on the control board 31 and is configured to operate the switching circuit mounted on the power system board 23 to control the AC power applied to the electric motor. A plurality of relatively large electrical components constituting the control-and-communication circuit, such as a transformer 32 and an electrolytic capacitor 33, are placed on this control board 31. A plurality of control-and-communication wires and communication wires 35, which pass through the inverter accommodating portion 9 via a grommet 34, are connected to the control board 31.

In the inverter module 21 having the above-described configuration, in order to ensure the vibration resistance, moisture resistance, and isolation of the power system board 23 and control board 31, the resin case 22 is filled with thermosetting resin 36, such as epoxy resin, so as to cover the top surface of the power system board 23 to encapsulate the power system board 23 in resin. The purpose of this is to ensure the isolation and moisture resistance by securing the switching circuit, which is composed of the semiconductor switching devices 22 and the like that are fixed by wire bonding, with the thermosetting resin 36 and to ensure highly reliable and satisfactory anti-vibration strength that can withstand severe thermal cycling, heat shock, vibration, and the like.

Figure 3:
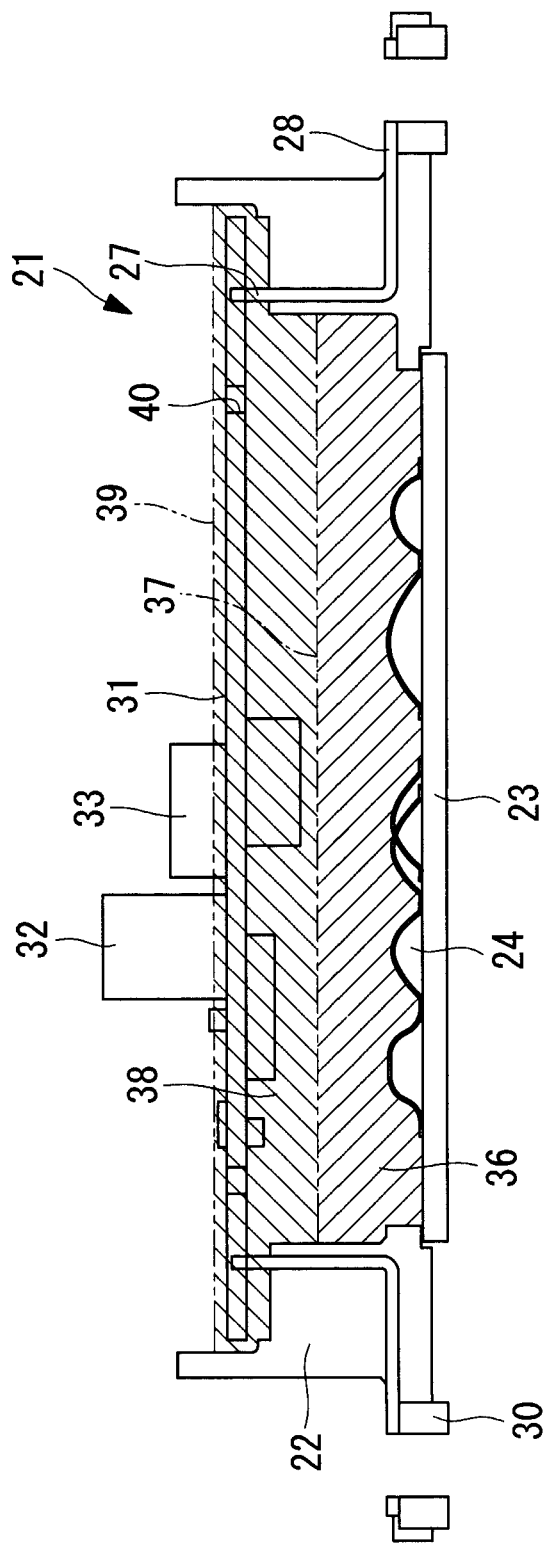
FIG. 3 is a view corresponding to a vertical cross-section of the inverter module shown in FIG. 2.

As shown in FIG. 3, the thermosetting resin 36 fills the resin case 22 to a height of about half in the height direction. A surface (resin-encapsulated surface) 37 of the thermosetting resin 36 is covered with a gel-like resin material 38, such as silicone gel. The gel-like resin material 38 is arranged to completely fill the gap between the resin-encapsulated surface 37 and the control board 31 and to fill to a height position 39 several millimeters above the surface of the control board 31, to cover at least the top surfaces of a microcomputer component, such as a CPU, and an oscillator-circuit component mounted on the top surface of the control board 31.

While the purpose of the gel-like resin material 38 is mainly to absorb vibration of the control board 31 to ensure the vibration resistance and isolation thereof, by making the gel-like resin material 38 fill to a height at which at least the top surfaces of the microcomputer component, such as a CPU, and oscillator-circuit component mounted on the top surface of the control board 31 are covered, as described above, these electrical components can be made moisture-resistant. This gel-like resin material 38 is arranged to fill the gap between the resin-encapsulated surface 37 and the control board 31 through a through-hole 40 that is provided at at least one location in the control board 31.

According to the above-described configuration, this embodiment provides the following advantages.

DC power supplied from the power source unit installed in the vehicle through the high-voltage cable to the inverter device 20 placed in the inverter accommodating portion 9 of the electric compressor 1 is inputted to the switching circuit on the power system board 23 via the P-N terminals 25 of the inverter module 21, is converted into three-phase AC power having a command frequency by the operation of the switching circuit composed of the semiconductor switching devices 24 and the like controlled by the control board 31, and is then applied to the electric motor in the motor housing 3 through the U-V-W terminals 26.

This rotationally drives the electric motor at a control command frequency, activating the compression mechanism. When the compression mechanism is activated, low-temperature, low-pressure refrigerant gas is introduced into the motor housing 3 from the refrigerant intake port 6. This refrigerant flows around the electric motor in the direction of the motor axis L toward the compressor housing 4 and is introduced into the compression mechanism. The refrigerant compressed to a high-temperature, high-pressure state by the compression mechanism is discharged into the compressor housing 4 and is then directed outside the electric compressor 1 through the discharge port 7.

During this process, the low-temperature, low-pressure refrigerant gas having been introduced into the motor housing 3 from the refrigerant intake port 6 and flowing in the direction of the motor axis L absorbs heat from the power system board 23 of the inverter module 21 that is placed in tight contact on the bottom surface of the inverter accommodating portion 9, through the housing wall of the motor housing 3, thereby forcibly cooling the heat-generating components mounted on the power system board 23, such as the semiconductor switching devices 24. In this way, the heat resistance characteristics of the inverter device 20 are ensured.

On the other hand, vibration of a running vehicle in which the electric compressor 1 is installed, vibration of the driving source thereof, rotational vibration of the electric compressor 1 itself, and the like are directly inputted to the inverter device 20 mounted on the electric compressor 1. Therefore, these vibrations are transmitted not only to the inverter module 21, the power system board 23, and the control board 31 constituting the inverter device 20, but also to the electrical components and circuits disposed on these boards 23 and 31.

The power system board 23 is integrated with the resin case 22 to form a module, and the fixing legs 30 are securely fixed to the bottom surface of the inverter accommodating portion 9 with the bolts. The electrical components, such as the semiconductor switching devices 24, and circuits mounted on the surface of the power system board 23 are encapsulated in the thermosetting epoxy resin 36 having isolation characteristics and moisture resistance, so that they are securely fixed and reliably protected. Accordingly, it is possible to ensure sufficient isolation and moisture resistance of the power system board 21 and to ensure satisfactory anti-vibration strength that can withstand severe thermal cycling, heat shock, vibration, and the like. Thus, the vibration resistance can be significantly improved.

The control board 31 disposed above the power system board 23 is elastically supported by being bonded to the gel-like resin material 38 that completely fills the gap between the lower surface thereof and the resin-encapsulated surface 37 and that fills to the height position 39, at which a part of the control board 31 is covered. Thus, the vibration applied to the control board 31 can be absorbed by the gel-like resin material 38. Accordingly, it is possible to sufficiently reduce vibrations transmitted to the control board 31, whereby damage to components and components dropping off the board, due to vibration of the control board 31, can be reliably prevented.

As a result, satisfactory anti-vibration strength of the power system board 23 and control board 31, which constitute the inverter module 21, can be ensured. Thus, the reliability of the vibration resistance of the inverter device 20 can be significantly improved. Because the necessary portions of the power system board 23 and control board 31 are covered by the resin materials 36 and 38, respectively, the isolation and moisture resistance can also be sufficiently ensured.

In particular, because the gel-like resin material 38 fills to the height position 39, at which the top surfaces of the microcomputer component, such as a CPU, and oscillator-circuit component mounted on the top surface of the control board 31 are covered, the top surfaces of the microcomputer component, such as a CPU, and oscillator-circuit component, which are originally coated in a moisture-resistant coating, are covered again with the gel-like resin material 38. Thus, the moisture-resistant effect of these components can be improved. Because this further improves the moisture resistance reliability of the control board 31, the moisture-resistant coating can be omitted in some cases.

The resin case 22 may be filled with the gel-like resin material 38 from the resin-encapsulated surface 37 to the height position 39, at which a part of the control board 31 is covered. Thus, compared with a case where the inverter accommodating portion is completely filled or a case where the inverter accommodating portion is filled with the gel-like resin material 38 such that the control board 31 is embedded, the amount of the gel-like resin material 38 for filling can be reduced. Therefore, the weight and cost can be reduced by the amount corresponding to the amount of heavy and expensive gel-like resin material 38 reduced. In addition, maintenance of the control board 31 can be performed when necessary.

Furthermore, in this embodiment, the through-hole 40 for filling the gel-like resin material 38 is provided at one or more locations in the control board 31, and the gel-like resin material 38 is filled through the through-hole 40. Therefore, the gap between the control board 31 and the resin-encapsulated surface 37 on the power system board 23 can be easily filled with the gel-like resin material 38. In addition, whether or not the gap is completely filled with the gel-like resin material 38 can be confirmed by the fact that the gel-like resin material flows out of the through-hole 40. Accordingly, filling of the gel-like resin material 38 can be appropriately and easily managed.

By integrating the inverter device 20 including the above-described inverter module 21, it is possible to improve the anti-vibration strength, moisture resistance, and isolation of the inverter device 20 that is most susceptible to the usage environment in the integrated-inverter electric compressor 1 for a vehicle, which is used under severe temperature and vibration conditions. In addition, because the weight and cost of the inverter device 20 can be reduced, the integrated-inverter electric compressor 1 can be improved in reliability and reduced in cost, and ease of installation in a vehicle can be improved.

Other Embodiments

Next, other embodiments of the present invention will be described with reference to FIG. 3.

Although the gel-like resin material 38 is filled to the height position 39, at which the top surfaces of the microcomputer component, such as a CPU, and oscillator-circuit component mounted on the top surface of the control board 31 are covered in the above-described first embodiment, filling may be performed as follows.

(1) The gel-like resin material 38 is completely filled into the gap between the resin-encapsulated surface 37 and the control board 31 and is filled to the height of about half of the thickness of the control board 31 so that the entire lower surface of the control board 31 is reliably bonded to the gel-like resin material 38.

(2) The gel-like resin material 38 is filled to a height position where the lower half of large electrical components provided on the control board 31, such as the transformer 32 and the electrolytic capacitor 33, are covered, so that the lower half of these electrical components is embedded in the gel-like resin material 38.

As in the case of (1) above, a vibration prevention effect of the control board 31 that is the same as the first embodiment can also be obtained by filling the gel-like resin material 38. Thus, the vibration resistance and isolation of the control board 31 can be ensured. In this case, although the top surfaces of the microcomputer component, such as a CPU, and oscillator-circuit component cannot be covered by the gel-like resin material 38, the moisture resistance is not degraded because these components are originally coated in a moisture-resistant coating.

As in the case of (2) above, by filling the gel-like resin material 38, the lower half of the large components provided on the control board 31, such as the transformer 32 and the electrolytic capacitor 33, can be embedded in the gel-like resin material 38, so that they are restrained by the gel-like resin material 38. In this way, the vibration-suppressing effect of the large components, such as the transformer 32 and the electrolytic capacitor 33, can be improved, and the vibration resistance of the control board 31 can be raised to a higher level.

The present invention is not limited to the invention according to the above embodiments, and it may be appropriately modified within a scope not departing from the spirit thereof. For example, in the above embodiments, the example in which the inverter accommodating portion 9 is formed integrally with the motor housing 3 has been described. However, they do not necessarily have to be integrally formed, and a configuration in which a separately formed inverter accommodating case is integrally mounted may be employed. The compression mechanism is not specifically limited, and any type of compression mechanism may be used. Furthermore, the shape and structure of the inverter module 21 may be variously modified.

REFERENCE SIGNS LIST

1: integrated-inverter electric compressor
2: housing
9: inverter accommodating portion
20: inverter device
21: inverter module
22: resin case
23: power system board
24: semiconductor switching devices
31: control board
32: transformer
33: electrolytic capacitor
36: thermosetting resin
37: resin-encapsulated surface
38: gel-like resin material
40: through-hole

The invention claimed is:

1. An inverter module in which a power system board that converts DC power supplied from a power source to AC power and applies the AC power to an electric motor and a control board that controls the AC power applied to the electric motor are integrated via a resin case, wherein
the inverter module is configured such that the power system board, on which a semiconductor switching device is mounted, is provided at the lower part of the resin case and the control board, on which a control-and-communication circuit operating at a low voltage, including a CPU, is provided above the power system board, and
the resin case is filled with a thermosetting resin to a height position where the top surface of the power system board is covered, so that the power system board is encapsulated in the resin, and is filled with a gel-like material from the upper surface of the filled thermosetting resin to a height position where a lower half of large components, including a transformer and an electrolytic capacitor, which are mounted on the top surface of the control board, is covered, and where the upper half of the large components is not covered.

2. An inverter module according to claim 1, wherein the gel-like material is filled to a height position where at least the top surfaces of the CPU, and an oscillator-circuit component, which are mounted on the top surface of the control board, are covered.

3. An inverter module according to claim 1, wherein the control board has a through-hole provided at at least one location, through which the gel-like material is filled.

4. An integrated-inverter electric compressor in which an inverter accommodating portion is provided on the outer periphery of a housing accommodating an electric motor and a compression mechanism, an inverter device that converts DC power to AC power and applies the AC power to the electric motor being integrally mounted therein, wherein
the inverter device including the inverter module according to claim 1 is integrally mounted in the inverter accommodating portion.

* * * * *